United States Patent [19]
Levine

[11] 3,780,224
[45] Dec. 18, 1973

[54] OPTICAL SYSTEM FOR TELEVISION CAMERA

[75] Inventor: Arnold M. Levine, Chatsworth, Calif.

[73] Assignee: International Telephone and Telegraph Corporation, New York, N.Y.

[22] Filed: Apr. 24, 1972

[21] Appl. No.: 246,883

[52] U.S. Cl. ............... 178/7.2, 178/7.85, 178/7.88, 178/7.92, 178/DIG. 1, 178/DIG. 38
[51] Int. Cl. ............................................. H04n 5/26
[58] Field of Search .................. 178/7.2, 7.85, 7.88, 178/7.89, DIG. 1, DIG. 23, DIG. 35, 6.5, DIG. 38; 179/15 AQ

[56] References Cited
UNITED STATES PATENTS

| | | | |
|---|---|---|---|
| 2,747,012 | 5/1956 | Dresser | 178/6.8 |
| 2,905,758 | 9/1959 | Walker | 178/DIG. 1 |
| 3,104,283 | 9/1963 | Moller | 178/7.85 |
| 3,258,595 | 6/1966 | Galante | 178/DIG. 1 |
| 3,469,026 | 9/1969 | Winik et al. | 178/DIG. 1 |
| 3,492,419 | 1/1970 | Bartonik | 178/7.92 |
| 3,567,856 | 3/1971 | Nezu | 178/7.2 |

*Primary Examiner*—Robert L. Richardson
*Attorney*—C. Cornell Remsen, Jr. et al.

[57] ABSTRACT

An electro-optical mast system having a plurality of cameras mounted in a vertical array, each of the cameras being operable to view a predetermined portion of 360° in a horizontal plane. Switching means are provided for alternately switching one of the cameras to an operable condition. Each of the cameras may have a field of view formed of a pair of opposed acute angles and switching means are provided for the field of view for switching the field of view from one of the acute angles to another of the acute angles. In addition, an overhead camera may be provided having a field of view whose axis is perpendicular to the horizontal plane. Moreover, each of the cameras may have a movable mirror associated therewith. The mirror is rotated in azimuth and elevation for target tracking operation of the camera in combination with a telescopic lens.

8 Claims, 7 Drawing Figures

PATENTED DEC 18 1973 3,780,224

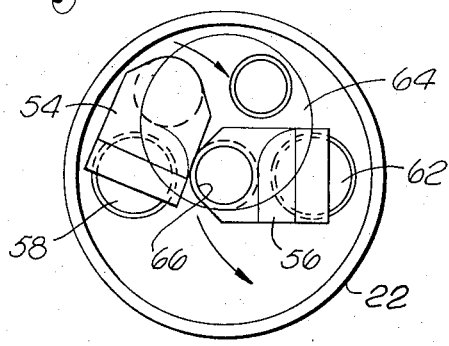
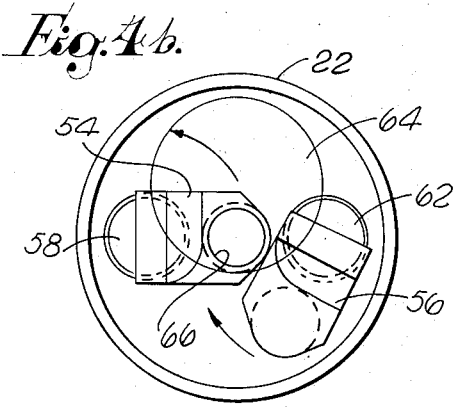
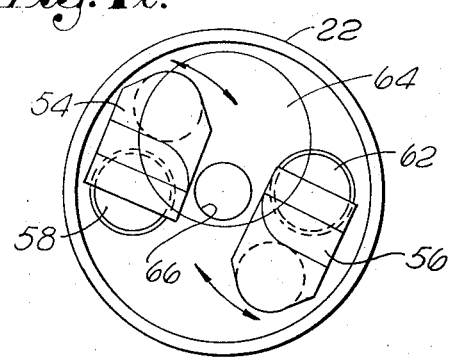
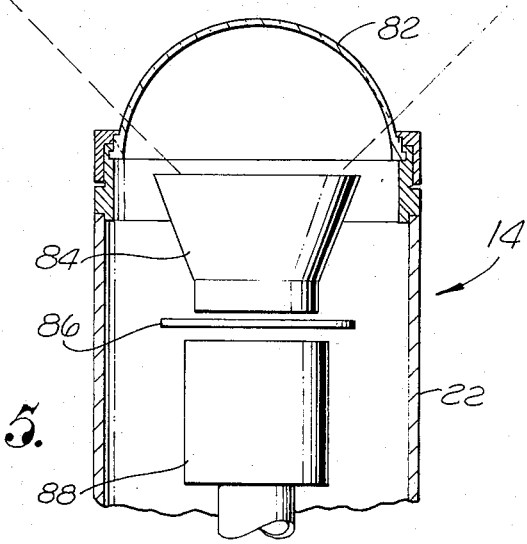
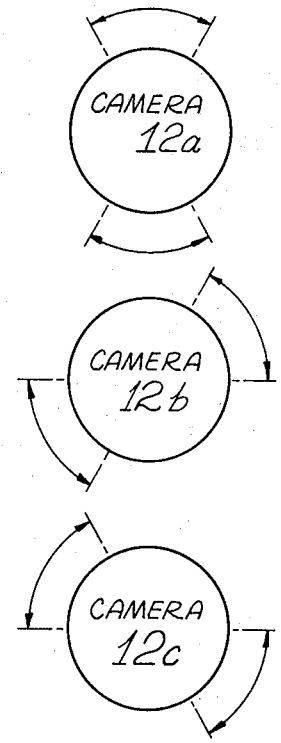

OPTICAL SYSTEM FOR TELEVISION CAMERA

ELECTRO-OPTICAL MAST SYSTEM

The invention relates in general to electro-optical mast systems and, more particularly, to a system for viewing 360° in a horizontal plane as well as in a plane perpendicular to the horizontal plane.

BACKGROUND OF THE INVENTION

In conventional multi-optical viewing systems, particularly those for transmitting or receiving a field of view having 360°, a plurality of cameras were utilized. Alternatively, the cameras were connected to lenses mounted in a horizontal plane with each of the lenses covering an acute angle of the 360°. It has been found, however, that in such a system, an extremely wide device must be utilized in order to obtain a 360° field of view coverage. Where the width of the structure is a problem, it has been found necessary to use alternative type arrangements.

In order to overcome the attendant disadvantages of prior art large field of view optical systems, the present invention provides an elongated electro-optical mast system which may be mounted in a relatively elongated structure. The present invention provides a rapid means for switching so that the entire 360° field of view may be rapidly scanned. In addition, a minimum number of optical components are utilized. Moreover, means may also be provided for viewing the field of view in a plane perpendicular to the 360° horizontal field of view.

SUMMARY OF THE INVENTION

More particularly, the invention comprises an electro-optical mast system having a plurality of cameras mounted in a vertical array. Each of the cameras is operable to view a predetermined portion of 360° in a horizontal plane. In addition, switching means are provided for alternately switching one of the cameras to an operable condition. Moreover, each of the cameras may have a field of view formed of a pair of opposite acute angles, and means are provided for switching the field of view from one of the acute angles to another of the angles. Moreover, an overhead camera means is provided having a field of view whose axis is perpendicular to the horizontal axis. In addition, each of the cameras may have a movable mirror associated therewith. The mirror is rotated 90° in both azimuth and elevation for target tracking operation of the camera in combination with a telescopic lens.

The advantages of the invention, both as to its construction and mode of operation, will be readily appreciated as the same becomes better understood by reference to the following detailed description when considered in connection with the accompanying drawings in which like referenced numerals designate like parts throughout the figures.

BRIEF DESCRIPTION OF THE DRAWINGS

FIG. 2 a–c illustrates various schematic views of the operational scope of the cameras in the system of FIG. 1;

FIG. 4 a–c shows various positions of the camera of FIG. 1 for different operational modes of the camera; and FIG. 5 depicts a view, partly in section, of the overhead camera used in the system.

DESCRIPTION OF THE PREFERRED EMBODIMENT

Figure 1:
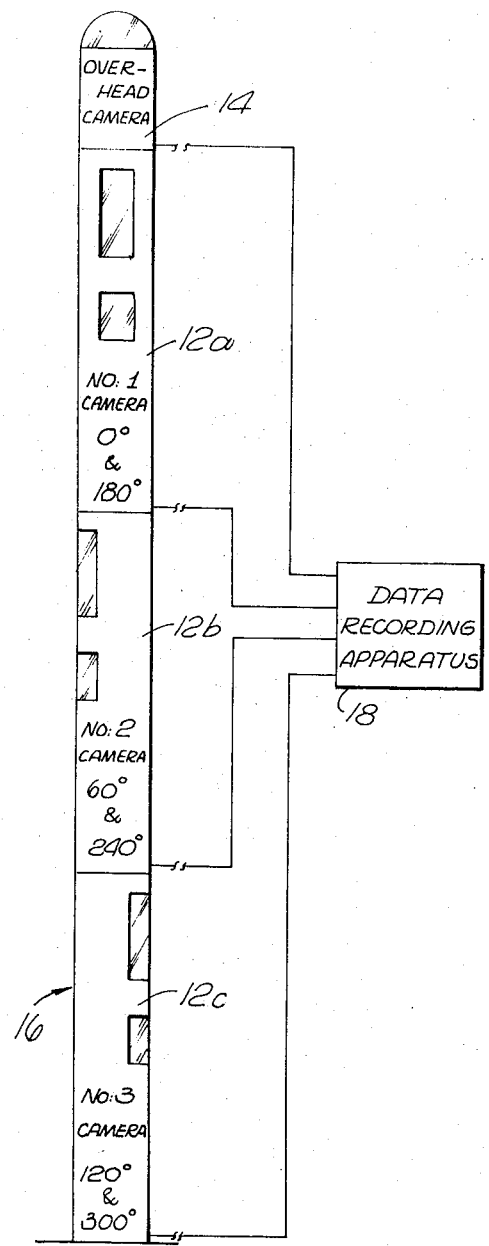
FIG. 1 depicts a schematic view of the electro-optical mast system made in accordance with the invention.

Referring now to the drawings, there is shown in FIG. 1 a schematic view of the electro-optical mast system made in accordance with the invention. The electro-optical mast system comprises a plurality of cameras denoted as 12a, 12b and 12c, as well as an overhead camera denoted as 14. Each of the cameras is stacked in an elongated fashion within a mast 16. In addition, electrical connections are made between each of the cameras to data recording apparatus 18.

Each of the cameras 12a, 12b and 12c is operational to provide a 60° sector view for opposite acute angles. Thus, as shown in FIG. 2a–c, camera 12a will view a 60° sector centered about 0°, as well as a 60° sector centered about 180°. Camera 12b will view a 60° sector centered about 60° and 240°, and camera 12c will view 60° sectors centered about 120° and 300°. Each of the cameras are normally individually operable so that only one of the sectors is viewed or recorded by the apparatus 18 at a time.

Figure 3:
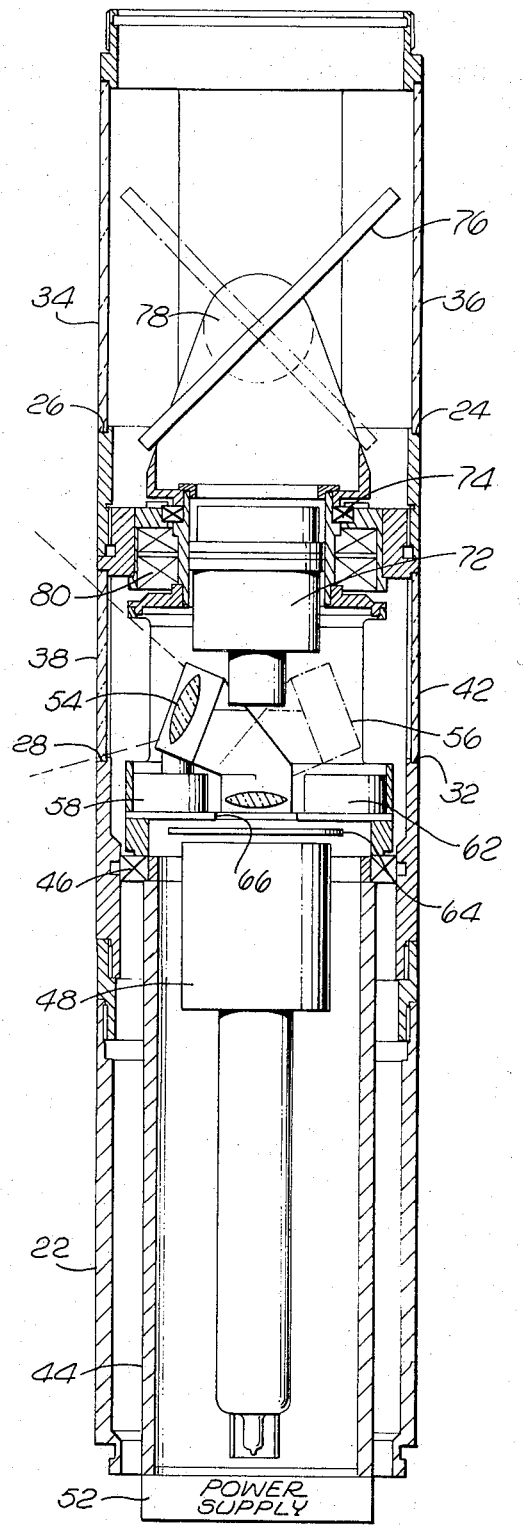
FIG. 3 illustrates a view, partly in section, of one of the cameras used in the system of FIG. 1.

Referring now to FIG. 3, there is shown one of the cameras 12a, 12b or 12c, which are normally identical in a partial cross-sectional view. Each camera further comprises a generally cylindrical outer tube 22 which is fixed. Positioned on the outer perimeter of the tube is a pair of upper openings 24 and 26, and a pair of lower openings 28 and 32. Positioned within these openings are sealed glass members 34, 36, 38 and 42, respectively. Mounted within the lower half of the housing is an inner tube assembly 44 which is rotatable by means of a bearing assembly 46 coupled to the outer tube 22. Mounted within the inner tube 44 is a vidicon tube 48 having its own power supply 52 secured to the bottom of the inner tube 44. The vidicon tube is a conventional type tube which can convert optical energy focused on the tube face into electrical signals which can be reproduced at a remote position.

Each of the windows 38 and 42 has associated therewith a lens assembly 54 and 56, respectively. The lens assemblies are rotatable by means of torque motors 58, and 62, respectively. Rotation of the lens assembly 56 by means of torque motor 62 provides a field of view through the lens assembly 56 from the window 42, as shown in FIG. 4a, which in turn is transmitted through a filter 64 to the face of the vidicon tube 48. Alternately, rotation of the torque motor 58, as shown in FIG. 4b, causes the lens assembly 54 to be rotated so as to provide a field of view from the window 38. In a third operational mode, depicted in FIG. 4c, both torque motors are actuated so that the opening 66 is clear of either lens assembly 54 and 56. In addition, the filter 64 is utilized to control the light level from the lens assemblies onto the face of the vidicon tube 48.

In the third mode of operation, when neither the lens assembly 52 nor 56 is adapted to transmit optical energy to the vidicon tube, a telephoto lens assembly 72 is utilized to transmit the field of view from the windows 34 or 36, respectively. The telephoto lens assembly including the lens 72 and the mount for mirror 76, 72 is mounted on a bearing assembly 74 so that it may be rotated concentric with the inner tube assembly 44. In addition, a mirror 76 is rotated by means of a motor 78 so that the view from the windows 34 or 36 is transmitted through the telephoto lens assembly 72 to the face of the vidicon tube 48. In addition, rotation of the mirror 76 by means of the motor 78 allows elevational tracking of a target. As can be seen in FIG. 3, in the position shown, the mirror 76 would transfer optical energy from the window 36 to the telephoto lens 72 when the lens assemblies 54 and 56 are clear of the opening 66, as in FIG. 4(c).

A drive motor 80 whose inner elements rotate with the lens assembly 72 while its outer elements remain fixed to the outer tube 22, allows azimuth tracking of a target. Inspection of FIG. 3 reveals that the entire mount of the mirror 76 will rotate along with lens 72 in response to drive by motor 80. The bearings 46 and 74, which allow rotation of the inner tube 44 simultaneously with the vidicon tube 48, as well as the telephoto lens 72, in addition prevent coordinate conversion problems when looking through the telephoto lens. Thus, elevational and azimuth tracking by means of the telephoto lens assembly 72 and the associated mirror 76 are provided of means by the motors 78 and 80, respectively.

Referring now to FIG. 5, the overhead camera 14 is shown in greater detail. The camera 14 is mounted on the outer tube 22 of the tube assembly and contains a domed window 82 at the top end thereof. The camera is relatively fixed and light signals transmitted through the dome of the window 82 pierce a conventional lens assembly 84 and are transmitted through a filter 86 to a vidicon tube 88. Normally, the dome 82 and the associated equipment depicted in FIG. 5, are fixed and are utilized merely for overhead viewing.

It should be understood that the cameras 12a, 12b, 12c and 14 could be operated simultaneously, as well as sequentially dependent upon the end use. Moreover, more or fewer cameras could be utilized in the mast with the sector angles changing accordingly. In addition, automatic switching from one camera to the adjacent sector camera could be provided when the system is operating in the tracking mode.

It should be further understood that the foregoing disclosure relates only to preferred embodiments of the invention, and it is intended to cover all changes and modifications of the examples of the invention herein chosen for the purpose of the disclosure which do not constitute departures from the spirit and scope of the invention.

What is claimed is:

1. An electro-optical mast system for visual surveillance through a wide range of azimuth angles and providing for visual elevation and angle tracking, comprising:

a substantially vertically oriented hollow cylindrical housing;

a plurality of television camera modules spaced axially within said housing, each of said modules including at least a first optical window within the wall of said housing;

a television camera tube mounted within each of said modules, said tube facing substantially vertically upward;

a telescopic lens generally above and spaced axially from said camera tube in each of said modules to direct a light pattern onto the face of the corresponding camera tube;

a mirror mounted rotatably about a first axis which is substantially a cross-sectional diameter of said housing, said mirror being rotatable thereabout to direct the field of view of said telescopic lens in each of said modules through said window at a vertical angle determined by the rotational position of said mirror;

an azimuth rotational mount permitting said mirror to be independently rotated about the vertical axis of said housing;

and a camera tube rotational mount permitting said camera tube to be independently rotated about said vertical housing axis, whereby the angular relationship in the azimuth plane between said mirror mount and said camera tube is subject to control.

2. Apparatus according to claim 1 in which there are two optical windows comprising a first pair of windows diametrically opposed within the wall of said housing, and said mirror is rotatable about said first axis to direct said field of view of said telescopic lens at said determinable vertical angle through either of said windows of said first pair.

3. Apparatus according to claim 2, in which a second pair of diametrically opposed optical windows is provided, each of said second pair being located below and in axially spaced relationship with a corresponding window of said first pair; and in which means are provided for selectably inserting at least one secondary lens system in the light path between said camera tube and said telescopic lens to provide a light pattern to said camera tube substantially only through said secondary lens system, said secondary lens system being adapted to view a predetermined angular sector through one of said secondary windows.

4. Apparatus according to claim 3 in which two of said secondary lens systems are provided each separately insertable in said light path and each corresponding to one window of said second window pair whereby one of two diametrically opposed substantially fixed view sectors may be selected.

5. Apparatus according to claim 4 in which said plural modules are joined axially in staggered azimuth angular relationship whereby said diametrically opposed view sectors of each module are centered about a different azimuth angle to provide wide angle coverage in increments equal to one of said view sectors selectably.

6. Apparatus according to claim 5 in which said camera tube is a vidicon.

7. Apparatus according to claim 5 including an uplooking television camera mounted at the top end of said housing to provide for over-head surveillance.

8. Apparatus according to claim 1 in which said camera tube is a vidicon.

* * * * *